United States Patent
Czamara et al.

(10) Patent No.: US 8,994,213 B1
(45) Date of Patent: Mar. 31, 2015

(54) SYSTEM AND METHOD FOR ESTABLISHING A POWER FEED FROM A SOURCE PANEL

(75) Inventors: Michael P. Czamara, Seattle, WA (US); Peter N. De Santis, Seattle, WA (US); Frank A. Glynn, New Milford, NJ (US); Osvaldo P. Morales, Seattle, WA (US); Matthew T. Corddry, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1025 days.

(21) Appl. No.: 13/071,488

(22) Filed: Mar. 24, 2011

(51) Int. Cl.
*H02J 7/00* (2006.01)
*H02J 9/00* (2006.01)

(52) U.S. Cl.
USPC .......................................................... 307/64

(58) Field of Classification Search
CPC .............. H02J 3/00; H02J 3/006; H02J 9/04; H02J 9/061; H02J 3/005
USPC .................................... 307/13, 18, 23, 64, 85
See application file for complete search history.

(56) References Cited

U.S. PATENT DOCUMENTS

| | | | |
|---|---|---|---|
| 4,060,735 A | 11/1977 | Pascucci et al. | |
| 5,675,194 A | 10/1997 | Domigan | |
| 6,008,971 A | 12/1999 | Duba et al. | |
| 6,992,247 B2 | 1/2006 | Rasmussen et al. | |
| 7,560,831 B2 | 7/2009 | Whitted et al. | |
| 8,686,594 B2 | 4/2014 | Morales et al. | |
| 2002/0135233 A1 | 9/2002 | Cratty | |
| 2007/0046103 A1 | 3/2007 | Belady et al. | |
| 2008/0018175 A1 | 1/2008 | McNamara et al. | |
| 2009/0314541 A1 | 12/2009 | Jones et al. | |
| 2010/0141038 A1* | 6/2010 | Chapel et al. ................... | 307/64 |
| 2010/0235671 A9 | 9/2010 | Jain | |
| 2012/0181869 A1 | 7/2012 | Chapel et al. | |

FOREIGN PATENT DOCUMENTS

| | | |
|---|---|---|
| JP | 2008082723 | 4/2008 |
| JP | 2009225546 | 10/2009 |

OTHER PUBLICATIONS

U.S. Appl. No. 13/626,723, filed Sep. 25, 2012, Peter G. Ross.
U.S. Appl. No. 12/892,750, filed Sep. 28, 2010, all pages.
U.S. Appl. No. 14/228,116, filed Mar. 27, 2014, Osvaldo P. Morales.

* cited by examiner

*Primary Examiner* — Carlos Amaya
(74) *Attorney, Agent, or Firm* — Robert C. Kowert; Meyertons, Hood, Kivlin, Kowert & Goetzel, P.C.

(57) ABSTRACT

A method of maintaining electrical power to electrical systems in operation during reconfiguration or maintenance of a power distribution system for the electrical systems includes providing a Y-connection in a set of electrical power lines. The Y-connection includes an input, a primary output, and a feed output. The set of electrical power lines supplies electrical power from a power source to the electrical systems through the primary output. To establish a feed for maintenance or reconfiguration of the power feed, power is fed from the power source through the feed output of the Y-connection to the electrical systems while power is being supplied to the electrical systems through the primary output.

27 Claims, 7 Drawing Sheets

SYSTEM AND METHOD FOR ESTABLISHING A POWER FEED FROM A SOURCE PANEL

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Primary power systems for computer systems in operation typically need to be maintained or reconfigured from time to time. Some data centers, for example, have "single threaded" distribution via the electrical power supply to the floor and/or to the rack, and in which maintenance can only be performed when the components using power in the data center, such as servers, are shut-off. The down-time associated with maintenance and reconfiguration of primary power systems in a data center may result in a significant loss in computing resources. In some critical systems such as hospital equipment and security systems, down-time may result in significant disruption and, in some cases, adversely affect health and safety.

In some systems, an automatic transfer switch provides switching between alternate power systems. For example, an automatic transfer switch may switch power between a primary power system and a back-up power system. If the automatic transfer switch coupled to a rack system fails, the system may no longer be able to automatically switch to back-up power during a primary system failure. To regain back-up functionality, the rack system may need to be powered down to allow replacement or repair of the automatic transfer switch. Powering the rack system down during replacement or repair of the automatic transfer switch results in a loss of computing resources.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and systems for establishing feeds to electrical systems, such as computer systems in a data center, are disclosed. According to one embodiment, a method of maintaining electrical power to electrical systems in operation during power system maintenance includes providing a Y-connection in a set of electrical power lines. The Y-connection includes an input, a primary output, and a feed output. The set of electrical power lines supplies electrical power from a power source to the electrical systems through the primary output. To establish a feed for maintenance or reconfiguration of the power distribution system, power is fed from the power source through the feed output of the Y-connection to the electrical systems while power is being supplied to the electrical systems through the primary output. The electrical power through the primary output may be disconnected or disabled for the electrical systems.

According to one embodiment, a system for supplying power during reconfiguration or maintenance of a power distribution system includes a Y-cable and a feed device. The Y-cable includes an input, a primary output, and a feed output. The input couples with a power source. The primary output supplies power from the power source to one or more electrical systems. The feed device includes a feed input and a feed output. The feed input of the feed device couples with the feed output of the Y-cable. The feed output of the feed device can couple with a rack power distribution unit that is coupled to the electrical systems to feed electrical power from the power source to the electrical systems.

According to one embodiment, a feed device for supplying power during reconfiguration or maintenance of a power distribution system includes a feed unit and one or more feed cables. The feed unit includes an input and one or more outputs. The input of the feed unit couples with a power source of a power system. The outputs of the feed unit transmit power from the input. The feed cables each include an input and an output. The outputs of the feed cables couple with an output receptacle of a rack power distribution unit such that the feed cable can supply power to electrical systems coupled to the rack power distribution unit. The inputs of the feed cables can be coupled with the outputs of the feed unit while the electrical systems are in operation to create a backfeed of electrical power from the power source to the electrical systems.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, a "match", in the context of matching sets of power lines, means that the characteristics between the sets of power lines are similar to one another within acceptable limits. A match does not require that the measurements of the two items be precisely equal. In some embodiments, the acceptable variance levels for a match are predetermined. For example, in one embodiment, for a voltage level match, an input power line may be predetermined to match a feed line if the difference in measured voltage between the two lines is 7 volts or less. Various characteristics, such as voltage, waveform, etc. may be used as criteria to determine a match.

As used herein, a "cable" includes any cable, conduit, or line that carries one or more conductors and that is flexible over at least a portion of its length. A cable may include a connector portion, such as a plug, at one or more of its ends.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "primary power" means any power that can be supplied to an electrical load, for example, during normal operating conditions.

As used herein, "floor power distribution unit" refers to a power distribution unit that can distribute electrical power to various components in a computer room. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "remote power panel" means any panel, device, module, component, or combination thereof, that can be used to transfer or distribute electrical power from one or more input conductors to one or more output conductors. In certain embodiments, a remote power panel includes main lug only ("MLO") panel conductors. A remote power panel may be housed in an enclosure, such as a cabinet.

As used herein, "reserve power" means power that can be supplied to an electrical load upon the failure of, or as a substitute for, primary power to the load.

As used herein, a "secondary feed" refers to any feed that supplies power that is separate from a primary power system for at least a portion of a primary power chain. As used herein, a "tertiary feed" refers to any feed that supplies power that is separate from two power systems (such as a primary power system and a reserve power system) for at least a portion of the two power system chains. In some embodiments, a secondary power feed or tertiary feed may be completely independent of the primary power distribution system. In some embodiments, however, a secondary feed or tertiary feed is not completely independent of the primary power distribution system. For example, both the primary power distribution system and a secondary feed may both receive power from the same utility feed, the same step-down transformer (for example, a primary-side transformer), the same uninterruptible power supply (for example, a primary-side), etc.

As used herein, "source power" includes power from any source, including but not limited to power received from a utility feed. In certain embodiments, "source power" may be received from the output of a transformer.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

In some embodiments, a power feed is established to electrical systems while the systems are live. Systems receiving power from an added feed may be of various types. Examples include hospital equipment, utility systems, security systems, military systems, telecommunications systems, or electronic commerce systems. In certain embodiments, an additional feed is provided to a critical system, such as a life support system. In some embodiments, the systems are computer systems in a data center. An additional power feed may allow the primary power system to be temporarily taken off-line for reconfiguration or maintenance of, for example, the primary power system. In some embodiments, the feed is accomplished by paralleling a primary power distribution system over a portion of a power distribution chain.

Figure 1:
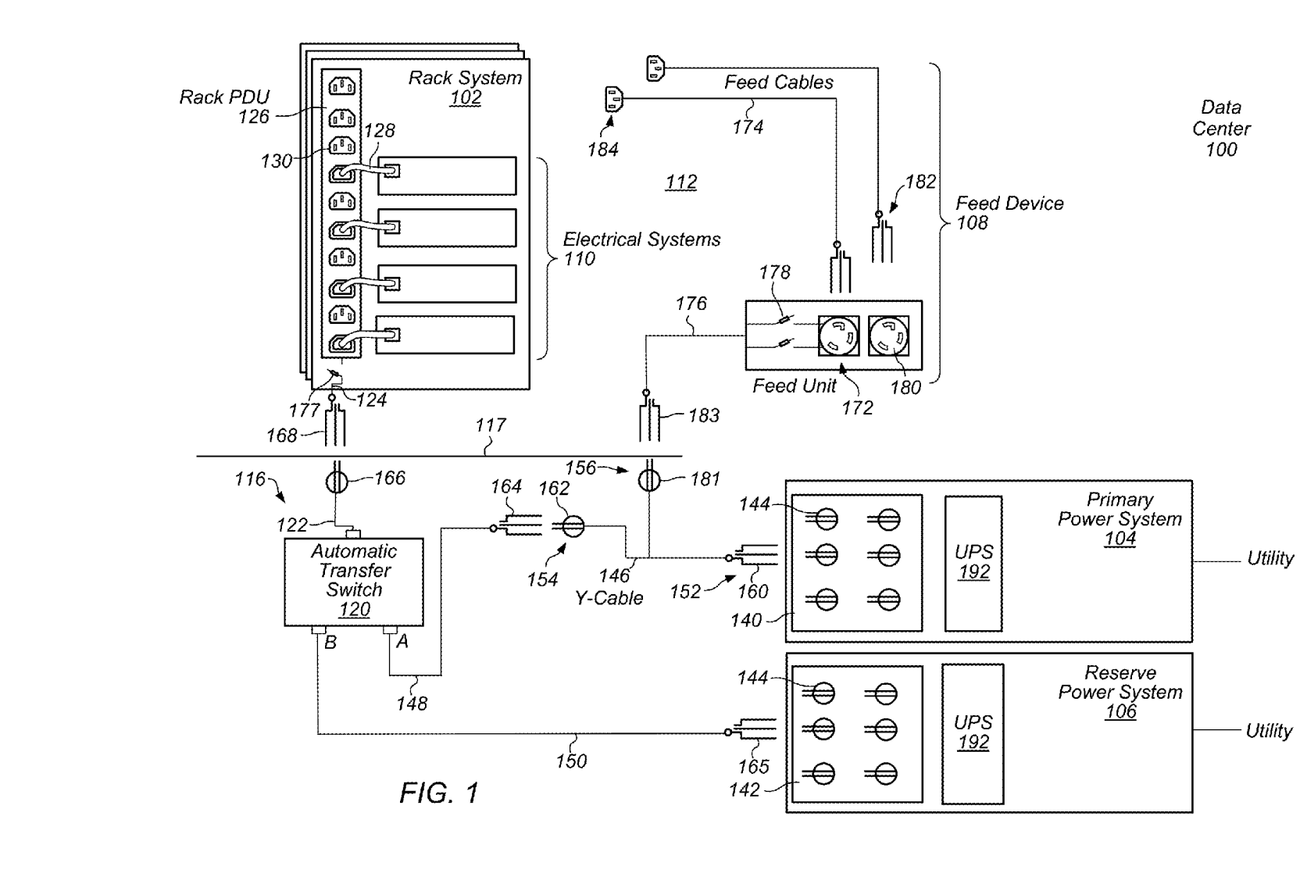
FIG. 1 is a block diagram illustrating one embodiment of a data center including a feed device that can provide power to electrical systems through a rack power distribution unit.

In some embodiments, a data center includes a feed device that can feed electrical power to electrical systems through a rack power distribution unit. In one embodiment, the feed device taps electrical power from a power source panel and feeds it to a rack power distribution unit. FIG. 1 is a block diagram illustrating one embodiment of a data center including a feed device that can provide power to electrical systems through a rack power distribution unit.

Data center 100 includes rack systems 102, primary power system 104, reserve power system 106, and feed device 108. Rack systems 102 include electrical systems 110. Electrical systems may include, for example, computer systems, rack-mounted servers, network control devices, power supply units, air moving devices, and mass storage devices.

Rack systems 102 are located in computing room 112. Electrical systems 110 may receive electrical power from primary power system 104 and reserve power system 106 by way of subfloor feed 116 to computing room 112. Each of primary power system 104 and reserve power system 106 is coupled to automatic transfer switch 120. Rack power distribution unit 126 in rack system 102 may be coupled to automatic transfer switch 120 by way of subfloor cable 122 and rack supply cable 124 at floor 117. Rack power supply cable 124 is coupled with rack power distribution unit 126.

Rack power distribution unit 126 includes rack PDU receptacles 130. In one embodiment, rack PDU receptacles 130 are IEC 60320 C13 receptacles. In one embodiment, rack PDU receptacles 130 are IEC 60320 C19 receptacles. In some embodiments, all of rack PDU receptacles 130 are wired in parallel with one another. In other embodiments, rack PDU receptacles 130 may be split into two or more banks of receptacles. The receptacles in each bank may be wired in parallel with one another. In some embodiments, one bank of receptacles is provided for each hot wire from the power source (one bank for A-neutral, another for B-neutral) or for each hot wire pairing from the power source (AB, BC, AC).

In operation of data center 100, any or all of rack PDU receptacles 130 may be used to supply power to electrical systems in rack system 102, such as servers. Electrical systems 110 are coupled to rack power distribution unit 126 by way of cables 128. Cables 128 are coupled in various rack PDU receptacles 130.

Primary power system 104 includes primary source receptacle panel 140. Reserve power system 106 includes reserve source receptacle panel 142. Each of primary source receptacle panel 140 and reserve source receptacle panel 142 includes source power receptacles 144. Automatic transfer switch 120 may be coupled to an appropriate one of receptacles 144 in primary source receptacle panel 140 by way of Y-cable 146 and primary power cable 148. Automatic transfer switch 120 may be coupled to an appropriate one of receptacles 144 in reserve source power panel 142 by way of reserve power cable 150.

Y-cable 146 includes input 152, primary output 154, and feed output 156. Input 152 may be coupled to primary power source panel 140. Primary output 154 may be coupled to primary power cable 148. Feed output 156 may provide a connection for coupling feed device 108.

Figure 2:
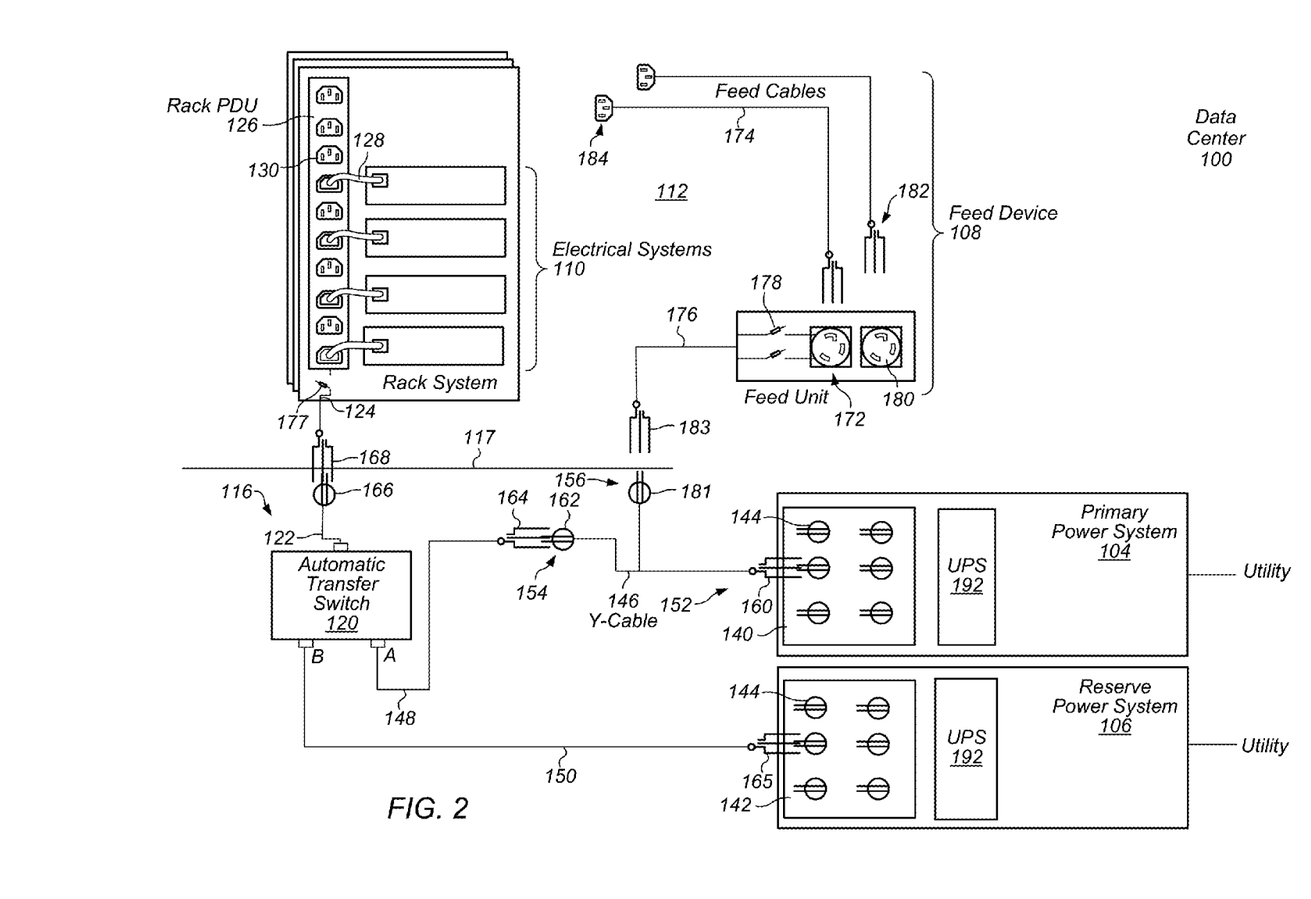
FIG. 2 illustrates an embodiment of a data center with a rack system connected to primary and reserve power systems through an automatic transfer switch.

FIG. 2 illustrates an embodiment of a data center with a rack system connected to primary and reserve power systems through an automatic transfer switch.

Input 152 of Y-cable 146 is coupled in one of receptacles 144 on primary source receptacle panel 140. In one embodiment, input connector plug 160 of Y-cable 146 is an L6-30P type plug and panel receptacles 144 on primary source receptacle panel 140 are L6-30R type receptacles.

Primary output 154 of Y-cable 146 is coupled with primary power cable 148. In one embodiment, connector portion 162 at primary output 154 of Y-cable 146 is an L6-30R type and connector portion 164 of primary power cable 148 is a L6-30P type.

Reserve power cable 150 is coupled with reserve source receptacle panel 142. Reserve power cable 150 is coupled in one of receptacles 144 on reserve source receptacle panel 142. In one embodiment, input connector plug 164 of reserve source receptacle panel 142 is an L6-30P type plug and panel receptacles 144 on reserve source receptacle panel 142 are L6-30R type receptacles.

Subfloor power cable 122 is coupled to automatic transfer switch 120 and rack supply cable 124. Rack supply cable 124 may supply power to rack power distribution unit 126. In one embodiment, connector portion 166 of subfloor power cable 122 is an L6-30R type and connector portion 168 of rack supply cable 124 is an L6-30P type.

As reflected in FIG. 2, automatic transfer switch 120 may be installed between primary source receptacle panel 140 and rack power distribution unit 126. The "A" side of the automatic transfer switch may be connected to receptacle 144 in primary source receptacle panel 140 of primary power system 104. The "B" side of the automatic transfer switch may be connected reserve source receptacle panel 142 of reserve power system 106. Automatic transfer switch 120 may feed power to electrical systems 110 in rack system 102 from either primary power system 104 or reserve power system 106.

In some embodiments, reserve power system 106 provides reserve power for all of the electrical systems supplied by primary power system 104. In some embodiments, reserve power system 106 is powered up at all times during operation of data center 100. Reserve power system 106 may be passive until a failure of one or more components of the primary power side, at which time the reserve power system may become active.

In some embodiments, a feed device provides a secondary feed from a source receptacle panel to electrical systems. The secondary feed may be used, for example, to maintain power to electrical systems in a rack system while maintenance or reconfiguration is performed on elements of a power system. (In FIGS. 1 and 2, for clarity, feed device 108 is shown disconnected from rack system 110 and the power distribution chain.) Feed device 108 includes feed unit 172 and feed cables 174. Feed unit 172 includes feed unit input 176, overload protection devices 178, and feed unit receptacles 180. Feed cables 174 include feed cable input 182 and feed cable output 184.

Overload protection devices 178 may include any suitable device for protecting systems receiving power from feed device 108, such as electrical systems 110 in rack system 102. In one embodiment, overload protection devices 178 are fast-acting 30 amp fuses.

Figure 3:
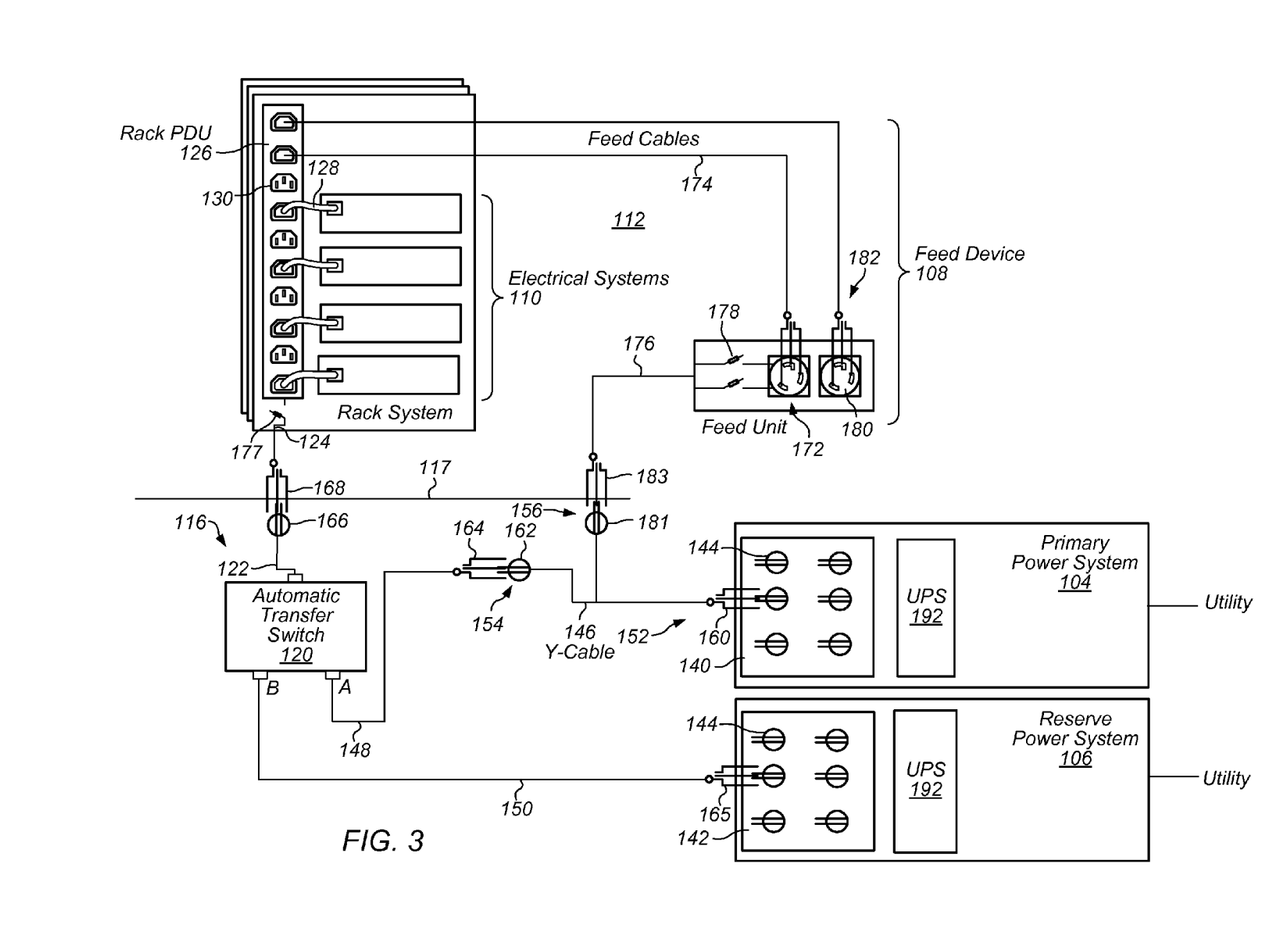
FIG. 3 illustrates one embodiment of a data center in which a feed has been established using a feed device.

In some embodiments, a feed unit supplies secondary power by backfeeding one or more receptacles in a rack power distribution unit. FIG. 3 illustrates one embodiment of a data center in which a feed has been established using a feed device. Feed unit input 176 is coupled with feed output 156 of Y-cable 146. Feed cables 174 are each coupled in one of rack PDU receptacles 130 of rack power distribution unit 126. To complete the backfeed, feed cable inputs 182 are coupled in feed unit output receptacles 180 of feed unit 172. In one embodiment, feed cable inputs 182 are coupled to feed unit 172 by way of an L6-20P plug. Feed device 108 may backfeed power to all of electrical systems 110 that are connected in parallel with the rack PDU receptacles 130 in which feed cable outputs 154 are connected.

In some embodiments, feed cable outputs 184 each couple in one of output receptacles 130 with a C13 plug. In other embodiments, feed cable outputs 184 each couple in one of output receptacles 130 with a C19 plug.

Although in the embodiment shown in FIG. 3, power is backfed to two receptacles in the rack PDU, power may in various embodiments be fed to any number of receptacles in a rack PDU. The number of backfed receptacles may depend on amount of current required by the electrical loads connected to the rack PDU. In certain embodiments, each of multiple rack PDUs in a data center may have a backfeed into only one receptacle. In certain embodiments, different feed cables of a feed device may have different phase combinations (hot A-neutral, hot B-neutral, AB, BC, etc.), each of which may supply power to a bank of receptacles on a rack PDU that has matching phase characteristics.

In some embodiments, the output for a secondary feed on a Y-cable has a different connector type or keying than the primary output on the Y-cable. A different connector type or keying may prevent an operator from incorrectly mating connectors. For example, in one embodiment, connector portion 181 on the feed output 156 of Y-cable 146 is an L7-30R type and connector portion 162 on the primary output 154 of Y-cable 146 is an L6-30R type. The L6-30R connector portion 162 on the primary output 154 of Y-cable 146 may mate with an L6-30P connector portion 164 on primary power cable 148. The L7-30R connector portion 180 at feed output 156 of Y-cable 146 may mate with an L7-30P connector plug 183 on feed unit 172. Because an L7-type and L6-type connector portions cannot be mated with one another, an operator will be prevented from inadvertently plugging a primary power cable into feed output 156 of Y-cable 146, or, conversely, from inadvertently plugging feed connector plug 183 into primary output 154 of Y-cable 146.

Although in the embodiment shown in FIGS. 1-3, feed unit 172 includes two feed unit receptacles 180 on feed unit 172, a feed unit may in various embodiments include any number of receptacles. In certain embodiments, a feed unit includes only one receptacle.

In some embodiments, maintenance or reconfiguration operations are performed under live conditions while electrical systems remain in operation as power is supplied through a feed device (for example, while maintaining servers in a powered up state and performing computing operations using the servers). In one embodiment, computer systems in a rack are maintained live while an automatic transfer switch between a floor power distribution unit and a source power panel is replaced. The replacement may be carried out in a "live" environment in which the computer systems in the rack remain in operation.

Figure 4:
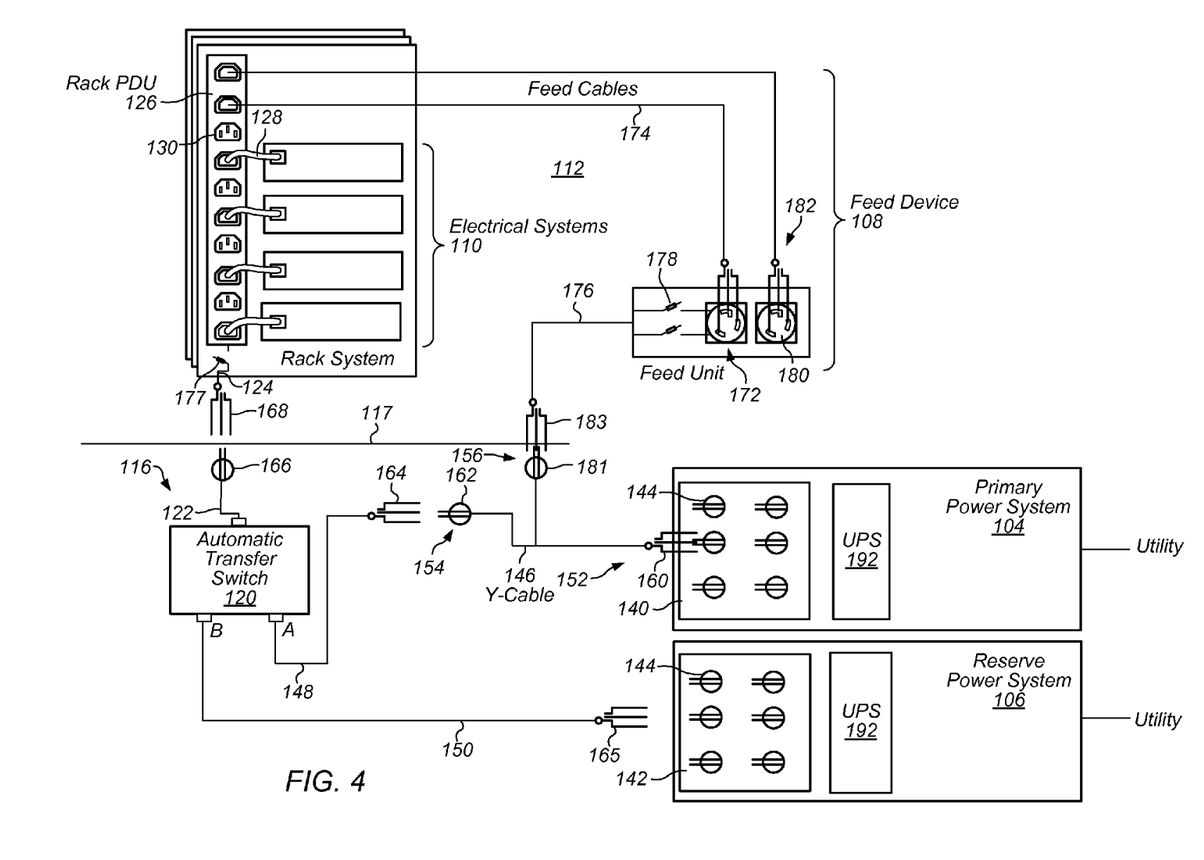
FIG. 4 illustrates one embodiment of a data center in which an automatic transfer switch has been disconnected for maintenance or replacement while electrical systems remain in operation in the data center.

FIG. 4 illustrates one embodiment of a data center in which an automatic transfer switch has been disconnected for maintenance or replacement while electrical systems remain in operation in the data center. Once a backfeed has been established (such as described above relative to FIG. 3), automatic transfer switch 120 may be disconnected and replaced or serviced. Electrical systems 110 may continue to receive power from primary power system 104 through backfeed device 108 while automatic transfer switch 120 is replaced or serviced. After service of automatic transfer switch 120 has been completed, backfeed device 108 may be disconnected from rack power distribution unit 114.

If automatic transfer switches are to be replaced or repaired in additional rack systems, backfeed device 108 may be used to provide a backfeed to such racks by repeating the procedure as described above.

In various embodiments, a backfeed to a power distribution is supplied by tapping an element in a primary power chain that is upstream from backfed power distribution unit. For example, in the embodiment shown in FIG. 4, the backfeed to a rack power distribution unit 126 is supplied from power source receptacle panel 140. Power source receptacle panel 140 is upstream from, and supplies power to, rack power distribution unit 126. In another embodiment, a backfeed may be supplied from an uninterruptible power supply in the primary power system (such as UPS 192 of primary power system 104 shown in FIG. 1). Nevertheless, in some embodiments, a backfeed may be supplied from a power source that is not in the primary power chain. For example, a backfeed may be supplied from reserve power system 106, or from a source external to the data center.

Figure 5:
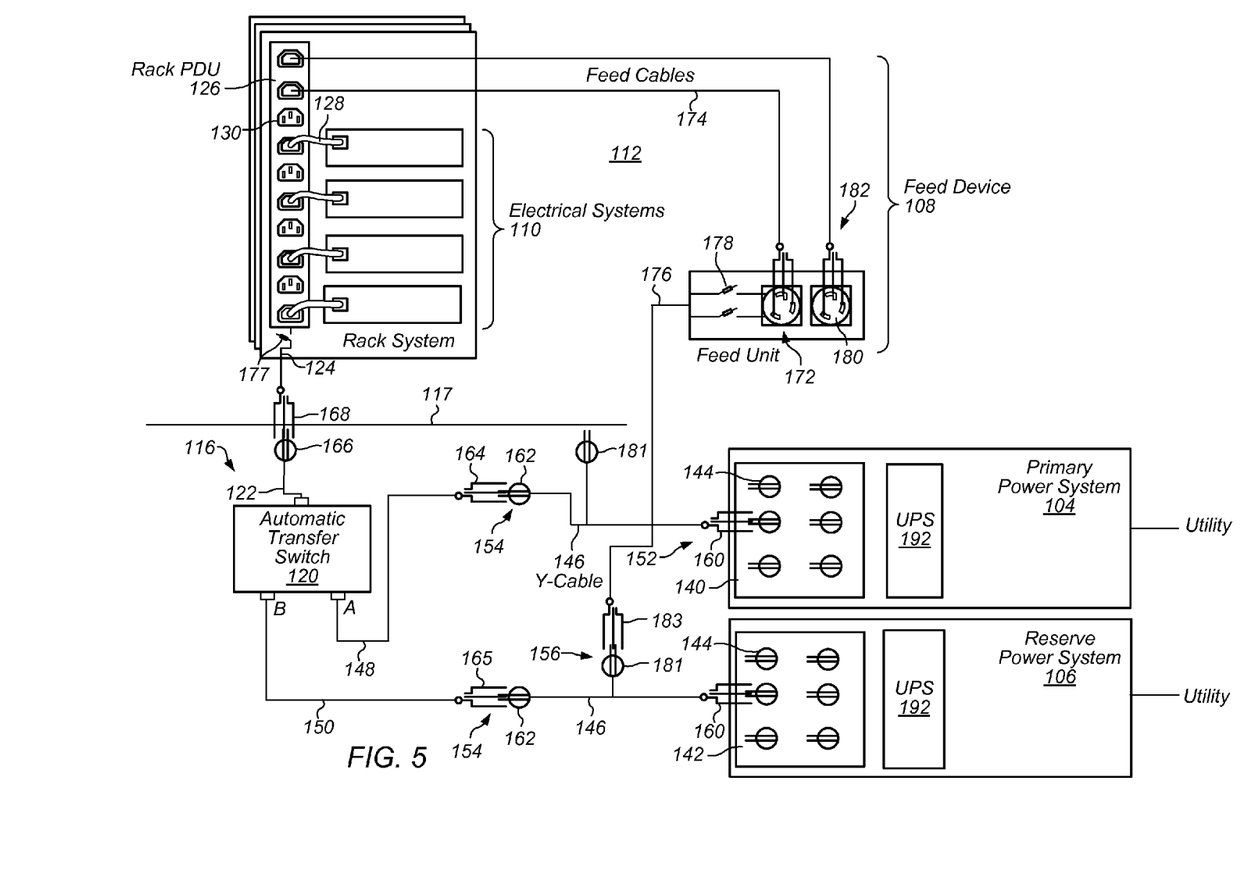
FIG. 5 illustrates an embodiment of a feed to a rack power distribution unit from a source receptacle panel of a reserve power system.

In certain embodiments, a Y-cable feed connection may be provided on a reserve power chain instead of, or in addition to, a Y-cable connection on the primary power chain. FIG. 5 illustrates an embodiment of a feed to a rack power distribution unit from a source receptacle panel of a reserve power system. In the embodiment shown in FIG. 5, a second Y-cable 146 is installed between reserve source receptacle panel 142 and reserve power cable 150. Feed device 172 may be coupled to the feed output of the second Y-cable in a manner similar to that described above relative to FIG. 3.

Primary power system 104 and reserve power system 106 may include one or more of various other components and sub-systems, such as transformers, generators, switchgear, and floor power distribution units. Primary power system 104 and reserve power system 106 each include UPS 192. In some embodiments, primary source receptacle panel 140 and reserve source receptacle panel 142 are each included in, or receive power from, a floor power distribution unit.

In some embodiments, a transformer for each of the power systems is coupled to a utility feed. The utility feed may be a medium voltage feed. In certain embodiments, the utility feed is at a voltage of about 13.5 kilovolts or 12.8 kilovolts at a frequency of about 60 Hz. Generators may provide power to primary power system 104 in the event of a failure of utility power to the transformer. In one embodiment, one generator provides back-up power for each of two or more primary power systems. UPS 192 may provide uninterrupted power to rack-mounted electrical systems in the event of a power failure upstream from UPS 192. In certain embodiments, UPS 192 receives three-phase power from a transformer. UPS 192 may supply three-phase power to a floor power distribution unit.

In one embodiment, receptacles 144 are NEMA L6-30R type. Each of the various receptacles on a floor power distribution unit may carry two phase lines and one ground. For example, each of the six receptacles 144 may be one of the six phase combinations AB, BC, AC, BA, CB, or CA. In some embodiments, a floor distribution unit may have one receptacle for each of the six phase combinations. In some embodiments, a floor distribution unit may have two or more receptacles for each of the six phase combinations. In some embodiments, a floor power distribution may have outputs for only some of the phase combinations (for example, AB, BC, and AC only). In certain embodiments, a floor distribution unit may receive and/or distribute two-phase power. In certain embodiments, a floor distribution unit may receive and/or distribute a single phase (for example, hot, neutral, and ground).

The number of primary power systems 104 may vary from embodiment to embodiment. In certain embodiments, the primary power side in a data center includes only one primary power system. In addition, the number of power distribution units, UPSs, switchgear apparatus may vary from embodiment to embodiment (and, within a given embodiment, from system to system). In some embodiments, primary power system 104 includes many floor power distribution units. As another example, a primary power system may have one UPS that can supply power to many floor power distribution units.

Components and sub-systems of primary power system 104 and reserve power system 106 may be provided in any suitable location. In one embodiment, primary source receptacle panel 140 and reserve source receptacle panel 142, Y-cable 146, and automatic transfer switch 120 in a sub-floor space below the floor of a computing room of a data center.

In FIGS. 1-4, for the sake of clarity, only one rack system, automatic transfer switch, and primary power panel are illustrated. In various embodiments, however, a system may have any number of rack systems, automatic transfer switches, and other components and systems. In one embodiment, two automatic transfer switches are provided for each rack system. Each of the two automatic transfer switches may control power for half of the servers in a rack system.

Figure 6:
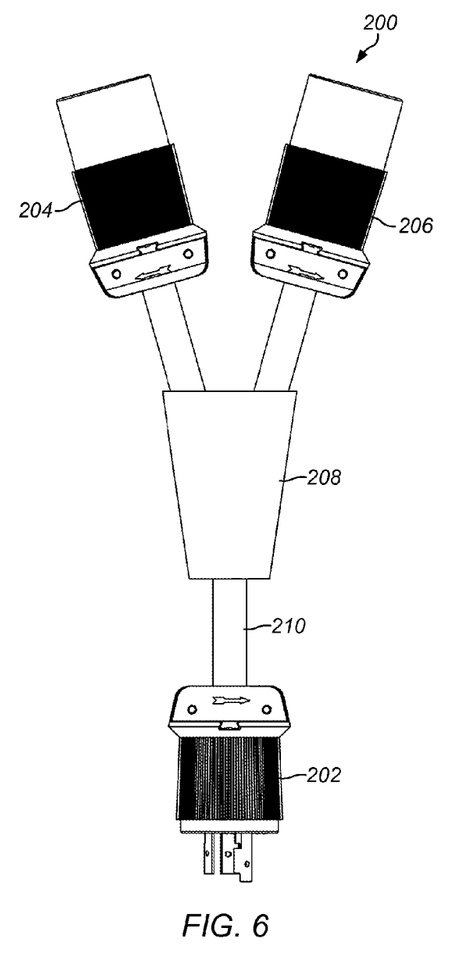
FIG. 6 illustrates one embodiment of a Y-cable that can provide a feed output for a backfeed from a power source.

FIG. 6 illustrates one embodiment of a Y-cable that can provide a feed output for a backfeed from a power source. Y-cable 200 includes input plug 202, primary output connector 204, feed output connector 206, Y adapter 208, and cable segments 210. Cable segments may couple Y-adapter 208 to input plug 202, primary output connector 204, feed output connector 206. Y-adapter 208 may branch one or more conductors from input plug 202 to primary output connector 204 and feed output connector 206. In one embodiment, input plug 202 is an L6-30P type plug, primary output connector plug is an L6-30C connector, and feed output connector 206 is an L7-30C. Y-adapter 208 may have 10-gauge conductors. In one embodiment, Y-cable 200 is about 1 foot, 2 inches in length. Y-cable 200 may, however, be any suitable length.

Figure 7:
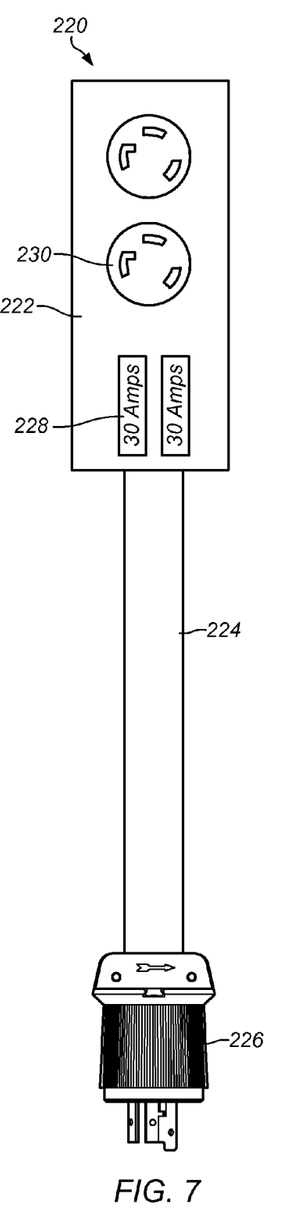
FIG. 7 illustrates one embodiment of a feed unit that can provide a feed output for a backfeed from a power source.

FIG. 7 illustrates one embodiment of a feed unit that can provide a feed output for a backfeed from a power source. Feed unit 220 includes enclosure 222, cable 224, input plug 226, overload protection devices 228, and receptacles 230. Each of overload protection devices 228 may protect one of the two lines in feed unit 220. In one embodiment, input plug 226 is an L7-30P plug and receptacles 230 are L6-20R receptacles.

Figure 8:
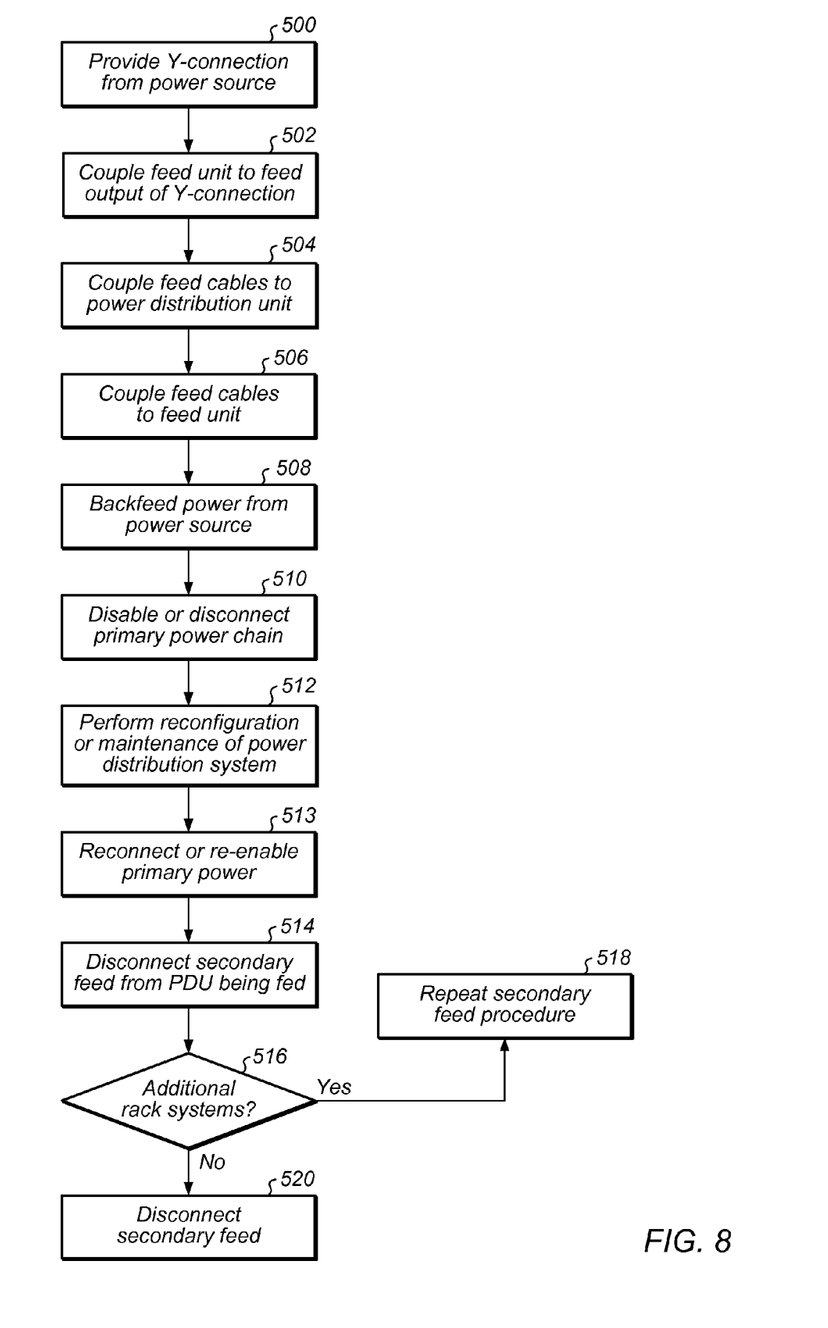
FIG. 8 illustrates one embodiment of adding a secondary power feed to computer systems in a rack in a data center and performing reconfiguration or maintenance operations while the computer systems remain in operation.

In some embodiments, a power feed is added to systems in a data center while the systems are in operation. The power feed may be accomplished, in some embodiments, by backfeeding a power distribution unit in the data center. FIG. 8 illustrates one embodiment of adding a secondary power feed to computer systems in a rack in a data center and performing reconfiguration or maintenance operations while the computer systems remain in operation. In some embodiments, reconfiguration or maintenance operations may be repeated for various racks in a data center all the way to the rack PDU level without removing power from the components in the racks.

As operations may be performed "hot", electrical safety precautions may be utilized, which may include ensuring that: (1) all electrical safety procedures are followed; (2) personal protective equipment is used; (3) proper change management/configuration management is in place, identifying the specific rack(s) being back-fed and notifying the proper personnel; and (4) the primary feed to the server rack(s) has no abnormal conditions that would jeopardize the rack during a secondary feed process. In certain embodiments, power characteristics such as voltage deviation, frequency deviation, and phase deviation are determined to be within acceptable ranges, for example, within plus or minus 5%.

At 500, a Y-connection is provided in a set of electrical power lines that supply electrical power from a power source to one or more electrical systems. The Y-connection may include an input, a primary output, and a feed output. In one embodiment, the Y-connection is provided through a Y-cable, such as Y-cable 248 described above relative to FIGS. 1-4. The power source may be a receptacle panel on an element of a primary power system or a reserve power system, such as a floor PDU.

At 502, a feed unit is coupled to the feed output of the Y-connection. Equipment for establishing a feed, such as feed unit 172 described above relative to FIG. 1, may be staged in any suitable location. In one embodiment, the backfeed device is positioned at the end of row to prevent interference with other server racks. In certain embodiments, test and/or feed equipment may be mounted on a cart.

At 504, one or more feed cables are coupled to a power distribution unit that is supplying primary power to electrical systems in the data center. The feed may be into a rack-level PDU that supplies power to computer systems in a rack (for example, a 5 KVA 208 V×24 Amp PDU). In some embodiments, the feed cables are coupled as a backfeed to one or more output receptacles in a rack power distribution unit (such as a non-active C19 connector). The output receptacles of the rack PDU may be connected in parallel with output receptacles that are supplying primary power to one or more systems in the data center.

At 506, the feed cables are coupled with the feed unit. For example, feed cables 174 may be coupled in receptacles 180 of feed unit 172, as described above relative to FIGS. 1-4. At 508, power may be backfed from the power source through the feed output of the Y-connection to the electrical systems in the rack. In some embodiments, power is backfed automatically upon coupling of the feed cables with the feed unit.

At 510, primary power is disabled or disconnected at a point in the primary power chain.

At 512, reconfiguration or maintenance operations may be performed on the power distribution system while primary power is disconnected or disabled and the secondary feed is supplying power to the systems. For example, as described above relative to FIGS. 1-4, a faulty automatic transfer switch may be removed and replaced. In another embodiment, a backfeed is used to carry out a live power cut-over during installation of an automatic transfer switch at the rack level. After installation of the ATS, the load bearing capacity of the PDU circuit through the ATS may be verified, for example, using an amprobe on the load side of the circuit.

At 513, after performing the at least one reconfiguration or maintenance operation, the primary power system may be reconnected or re-enabled.

At 514, the secondary feed may be disconnected from the power distribution unit being fed. Tests may be performed to verify that the rack is operating properly, and that no alarms are present at the PDU or UPS.

At 516, a determination is made whether reconfiguration or maintenance procedures are needed for additional racks. If so, all or part of the procedure may be applied to additional racks at 518. In certain embodiments, the input feed lines may remain connected to the same power source while reconfiguration or maintenance is performed on several racks in a data center. In some embodiments, a secondary feed may be established to numerous PDUs. For each PDU, tests may be performed to establish the appropriate phase and whether a match exists before connecting the input lines to a backfeed line for the PDU. For example, the rack PDU for a one rack may have power with an AB phase combination, the rack PDU for another rack may have power with a CB phase combination, and so on. In some cases, a single rack PDU may have sets of receptacles on different phase combinations. Thus, in some embodiments, a backfeed procedure may be performed multiple times on a single rack PDU (for example, once for each phase combination on the rack PDU from which power is being supplied).

When no more circuits are to be backfed, the feed device may be disconnected from the Y-connection at 520.

In some embodiments, a feed unit is used to provide power during maintenance or repair of a power distribution unit. In one embodiment, a feed unit is used to establish or maintain power to electrical systems coupled to a rack power distribution unit in the event of a blown fuse or tripped breaker in the rack power distribution unit. For example, referring to FIG. 4, feed unit 108 may be used to maintain or establish a power feed to electrical systems 110 where circuit protection device 177 on rack power distribution unit 126 has been tripped. The feed may be used, for example, to maintain power during service or replacement of circuit protection device 177.

Although in the examples described above, the secondary feed or backfeed was established by feeding into a power distribution unit, in certain embodiments, a secondary or tertiary feed may be established by feeding into other elements in a power distribution system. In certain embodiments, a secondary feed is established by backfeeding into a remote power panel.

Although in the examples described above, a secondary feed is made into a rack-level PDU, a secondary power feed may in various embodiments be supplied to any component in a system. In one embodiment, a backfeed is established into output receptacles of a floor PDU. The power source may come from any source, such as different floor PDU, a UPS, or other system. A floor PDU back feed may be established, for example, to replace a circuit breaker in the floor PDU.

In certain embodiments, the backfeed may be synchronized with power from the power source. Synchronization may include establishing a match between the pair of backfeed lines in backfeed cable and a combination of input lines from a floor power distribution unit. Secondary feed lines and input lines are tested to determine a match between a pair of lines in the set of secondary feed lines and a pair of lines in the set of input lines to match the phase of a pair of secondary feed lines with the phase of the a pair of input lines. Matching may include determining characteristics including wave form, line voltage, frequency, phase sequence, and phase angle. In some embodiments, an oscilloscope is used for testing of various characteristics.

In various embodiments described above, a synchronization system may provide for manual testing for synchronization between a power source and a power distribution unit to be fed. In certain embodiments, however, testing to establish synchronization may be performed automatically or semi-automatically, for example, by a processor in a synchronization system. In addition, in some embodiments, coupling of a power source (via, for example, a set of input lines) with a power distribution unit to be fed (via, for example, a set of secondary feed lines to the PDU) may be performed automatically or semi-automatically, for example, by a processor in a synchronization system.

In some embodiments, meters may be used to test electrical power characteristics of a feed input. In certain embodiments, one or more meters are integrated into an enclosure for a backfeed device. In other embodiments, one or more meters are provided as a stand alone measurement device, such as a stand-alone oscilloscope.

In certain embodiments, the power source for a secondary feed may be a PDU other than the primary floor PDU for the circuit in the rack. In such embodiments, a maximum variation may be established for the potential. In one embodiment, the potentials allowed to differ by no more than of 7 VAC. In another embodiment, the potential is allowed to differ by no more than 5%. In some embodiments, phase integrity may be verified by two electricians.

In various embodiments described above, a feed system is wired to provide any combination of phases from a three-phase power source. A feed system may, however, provide other types of power (for example, two-phase, single phase). In one embodiment, a secondary feed system receives two-phase power from a power source and allows synchronization for any combination of phases of the two-phase power. In one embodiment, a secondary feed system receives single-phase power (for example, one hot and one neutral) from a power source and allows synchronization with any phase and neutral of a poly-phase system.

In various embodiments described above, a secondary feed is established for systems during operation of the systems. In certain embodiments, however, some or all of the systems in a data center may be taken out of operation during establishment of a secondary feed.

Although in some embodiments described herein, an additional feed is a secondary feed connected in parallel to a single primary feed, power feeds may, in various embodiments, be added to systems having any number of existing feeds. Thus, an additional power feed may be a secondary power feed, a tertiary power feed (for example, a feed to a system receiving power from two existing power systems), etc.

In some embodiments described herein, a feed is provided through a connection to sub-floor systems in a power distribution system. Power feeds, however, be coupled to power components in any location. In some embodiments, primary power distribution system, reserve power system, or backup feed system components are provided on the ceiling of a computing room (for example, power cables suspended from the ceiling or in trays in the computing room).

For illustrative purposes, cables and devices have been described herein as having one or more "inputs" and "outputs". Such inputs and outputs may include various contacts or conductors ends for conductors in the cable or device. Cables and devices having inputs and outputs may be passive (for example, a cable having wires that transmit power from one end of the cable to the other end). In some embodiments, input and output ends of a cable are reversible. For example, both ends of a cable may include an L6-30P plug.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of maintaining electrical power to electrical systems in operation during reconfiguration or maintenance of a power distribution system for the electrical systems, comprising:

providing a Y-connection in a set of electrical power lines, wherein the Y-connection comprises an input, a primary output, and a feed output, wherein the primary output and the feed output share a common electrical connection to the input via one or more branched conductors, wherein the set of electrical power lines is configured to supply electrical power from a power source to the electrical systems through the primary output;

feeding power from the power source through the feed output of the Y-connection to at least one of the one or more electrical systems while power is being supplied to the electrical systems through the primary output; and disconnecting or disabling the electrical power through the primary output for at least one of the electrical systems.

2. The method of claim 1, wherein feeding power from the power source through the feed output to one or more of the electrical systems comprises backfeeding power through at least one rack power distribution unit for at least one of the electrical systems.

3. The method of claim 1, wherein the source power is received from a floor power distribution unit coupled to the input.

4. The method of claim 1, further comprising providing overload protection in one or more lines for the power being fed through the feed output to the at least one electrical system.

5. The method of claim 1, wherein feeding power from the power source through the feed output of the Y-connection to at least one of the one or more electrical systems comprises:
coupling the input of a feed unit to the feed output of the Y-connection;
coupling one or more feed cables to the at least one electrical system; and
coupling the one or more feed cables to an output of the feed unit.

6. The method of claim 5, wherein coupling the one or more feed cables to the at least one electrical system comprises:
coupling a first feed cable to a first set of electrical systems; and
coupling a second feed cable to a second set of electrical systems; and
wherein coupling the one or more feed cables to an output of the feed unit comprises:
coupling the first feed cable to a first receptacle of the feed unit; and
coupling the second feed cable to a second receptacle of the feed unit.

7. The method of claim 1, further comprising performing at least one maintenance operation on the power distribution system while primary power is disconnected or disabled and the feed is supplying power to the systems.

8. The method of claim 7, wherein power from the primary output to at least one of the electrical systems is provided through an automatic transfer switch configured to alternately supply power from the primary output or from a reserve power system, wherein performing the at least one maintenance operation comprises replacing or repairing the automatic transfer switch while the at least one electrical system is being supplied with power through the feed output.

9. The method of claim 1, further comprising performing at least one reconfiguration of the power distribution system while primary power is disconnected or disabled and the feed is supplying power to the systems.

10. The method of claim 1, further comprising:
performing at least one maintenance operation or reconfiguration of the power distribution system while primary power is disconnected or disabled and the feed is supplying power to the systems;
reconnecting or re-enabling the primary power after performing the at least one reconfiguration or maintenance operation; and
disconnecting the feed after primary power has been reconnected or re-enabled.

11. The method of claim 1, wherein the feed bypasses at least one overload protection device for a rack power distribution unit supplying power to at least one of the electrical systems, the method further comprising performing maintenance on or resetting the overload protection device.

12. The method of claim 1, wherein the power source is a primary power system for at least one of the electrical systems.

13. The method of claim 1, wherein the power source is a reserve power system for at least one of the electrical systems.

14. A system for supplying power during reconfiguration or maintenance of a power distribution system, comprising:
a Y-cable comprising an input, a primary output, and a feed output, wherein the input is configured to couple with a power source and the primary output is configured to supply power from the power source to one or more electrical systems; and
a feed device comprising:
a feed input configured to couple with the feed output of the Y-cable; and
a feed output configured to couple with one or more rack power distribution units coupled to at least one of the electrical systems, wherein the feed output is configurable to supply power from the power source to the at least one electrical system.

15. The system of claim 14, wherein the primary power source comprises a floor power distribution unit, wherein the Y-cable input is configured to couple with the floor power distribution unit to receive primary power.

16. The system of claim 14, wherein the feed output is configured to couple in an output receptacle of at least one of the rack power distribution units to backfeed power to electrical systems coupled to one or more other output receptacles of the rack power distribution unit.

17. The system of claim 14, wherein the feed comprises at least one overload protection device for the power being fed to the electrical systems from the feed output.

18. The system of claim 14, wherein the feed device comprises:
a feed unit comprising:
an input configured to couple with the feed output of the Y-cable; and
one or more outputs configured to transmit power from the input; and
a feed cable configured to couple at least one of the outputs of the feed unit with at least one of the rack power distribution units coupled to the electrical systems.

19. The system of claim 17, wherein the feed unit further comprises at least one overload protection device configured to protect at least one line of the feed from overload.

20. The system of claim 17, wherein the connector type or keying for the input of the feed unit is different from the connector type or keying for input of the feed cable.

21. The system of claim 14, wherein the electrical systems are located in a data center room, wherein a power distribution unit and at least a portion of the Y-cable are located outside of the data center room,
wherein the feed device is configurable to carry power from the feed output of the Y-cable to at least one rack power distribution unit in the data center room.

22. The system of claim 14, wherein the connector type or keying for the primary output of the Y-cable is different from the connector type or keying for the feed output.

23. A feed device for supplying power during reconfiguration or maintenance of a power distribution system, comprising:
a feed unit comprising:
one or more inputs configured to couple with a power source of a power system; and
one or more outputs configured to transmit power from the input; and
one or more feed cables, each of at least one of the feed cables comprising:
an input; and an output configured to couple with an output receptacle of one or more rack power distribution units such that the feed cable supplies power through the feed unit to one or more electrical systems coupled to the one or more rack power distribution units, wherein the input of at least one of the feed cables is configurable to couple with at least one of the outputs of the feed unit while the electrical systems are in operation to create a backfeed of power to the electrical systems coupled to the one or more rack power distribution units, wherein the power source coupled to the input of the feed unit and the electrical systems that are in operation receive power from the power system via a common electrical connection.

24. The device of claim 23, wherein the feed unit further comprises one or more overload protection devices configured to protect at least one line of the feed from overload.

25. The device of claim 23, wherein the connector type or keying for the input of the feed unit is different from the connector type or keying for input of the feed cable.

26. The device of claim 23, wherein the feed unit comprises two or more outputs, wherein each of at least two of the two more outputs of the feed unit is configured to transmit power from at least one of the inputs of the feed unit.

27. The device of claim 23, wherein the feed unit comprises:
one or more overload protection devices configured to protect at least one line of the feed from overload;
an enclosure at least partially housing at least one of the one or more overload protection devices;
one or more output receptacles on the enclosure; and
one or more cables configured to transmit power to the output receptacles.

* * * * *